US011424044B2

(12) United States Patent
Mevius et al.

(10) Patent No.: US 11,424,044 B2
(45) Date of Patent: Aug. 23, 2022

(54) WHILE A NUCLEAR REACTOR ELEMENT EXTENDS INTO A CASK, CUTTING THE ELEMENT TO A LENGTH EQUIVALENT TO INTERNAL HEIGHT OF THE CASK

(71) Applicants: JOINT STOCK COMPANY "ROSENERGOATOM", Moscow (RU); Joint Stock Company «PDC UGR», g. Seversk (RU); Joint Stock Company «Science and Innovations», Moscow (RU)

(72) Inventors: Vyacheslav Vladimirovich Mevius, g. Seversk (RU); Andrei Vladimirovich Mevius, g. Seversk (RU); Dmitriy Gennad'evich Yuzhakov, g. Seversk (RU); Aleksey Vyacheslavovich Zubavlenko, g. Seversk (RU); Ivan Nikolaevich Korlyukov, g. Seversk (RU); Vasiliy Arkhipovich Dmitriev, g. Seversk (RU)

(73) Assignees: JOINT STOCK COMPANY "ROSENERGOATOM", Moscow (RU); JOINT STOCK COMPANY «PDC UGR», G. Seversk (RU); JOINT STOCK COMPANY «SCIENCE AND INNOVATIONS», Moscow (RU)

( * ) Notice: Subject to any disclaimer, the term of this patent is extended or adjusted under 35 U.S.C. 154(b) by 0 days.

(21) Appl. No.: 16/627,733

(22) PCT Filed: Aug. 28, 2018

(86) PCT No.: PCT/RU2018/000566
§ 371 (c)(1),
(2) Date: Dec. 30, 2019

(87) PCT Pub. No.: WO2019/240614
PCT Pub. Date: Dec. 19, 2019

(65) Prior Publication Data
US 2021/0193341 A1 Jun. 24, 2021

(30) Foreign Application Priority Data

Jun. 14, 2018 (RU) .......................... RU2018121735

(51) Int. Cl.
G21C 19/36 (2006.01)
G21D 1/00 (2006.01)
(52) U.S. Cl.
CPC ............. *G21C 19/36* (2013.01); *G21D 1/003* (2013.01)
(58) Field of Classification Search
CPC ................................ G21C 19/36; G21D 1/003
(Continued)

(56) References Cited

U.S. PATENT DOCUMENTS 5,098,644 A * 3/1992 McDaniels ............ G21C 19/32
376/261
5,227,123 A * 7/1993 Baversten ............ G21C 19/207
376/260
(Continued)

*Primary Examiner* — Jack W Keith
*Assistant Examiner* — Daniel Wasil
(74) *Attorney, Agent, or Firm* — Brandon V. Zuniga; James R. Gourley; Carstens & Cahoon, LLP

(57) ABSTRACT

A method of fragmentation of elements of a nuclear reactor includes placement of elements inside a cask and subsequent cutting, the cask being perforated. Each element is lowered into the cask by a full internal height of the cask using a gripper having clamping jaws. The element is intercepted at an upper edge of the cask, lifted, and positioned using video surveillance and artificial lighting so that a hydraulic cutter is directly under the clamping jaws. The element is cut at a point corresponding to a level of the upper edge of the cask, separating from the element a fragment equal to the internal height of the cask. Then the upper part of the element (Continued)

remaining after cutting is lowered inside the cask by the full internal height of the cask and the cutting of the element into fragments is repeated until the element is fully cut to fragments.

4 Claims, 1 Drawing Sheet

(58) Field of Classification Search
USPC .......................................... 376/260, 261, 272
See application file for complete search history.

(56) References Cited

U.S. PATENT DOCUMENTS

| 5,936,863 A * | 8/1999 | Kostelnik | G06Q 10/08 |
| | | | 376/260 |
| 2015/0206610 A1* | 7/2015 | Carver | G21F 5/10 |
| | | | 376/261 |

* cited by examiner

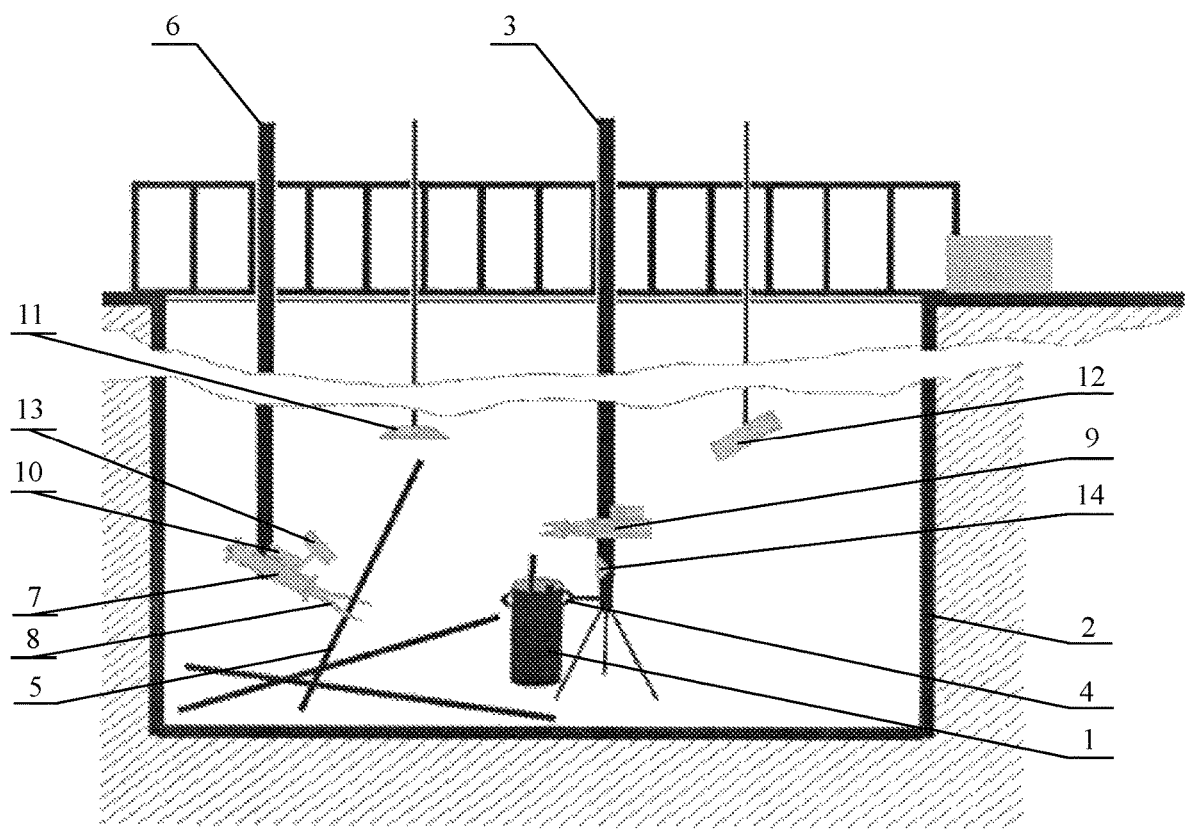

WHILE A NUCLEAR REACTOR ELEMENT EXTENDS INTO A CASK, CUTTING THE ELEMENT TO A LENGTH EQUIVALENT TO INTERNAL HEIGHT OF THE CASK

CROSS-REFERENCE TO RELATED APPLICATIONS

This application is a US 371 application from PCT/RU2018/000566 filed Aug. 28, 2018, which claims priority to Russian Application No. 2018121735 filed Jun. 14, 2018, the technical disclosures of which are hereby incorporated herein by reference.

The invention relates to the field of nuclear technology, in particular, to the disposal of spent long-dimensional elements of a nuclear reactor, and can be used at nuclear power plants or special plants.

When decommissioning nuclear power units, it becomes necessary to fragment the technological equipment of a nuclear reactor, including long-dimensional elements in the compartments of cavities of vessel internals, cooling pond of water-water energetic reactors into fragments.

Fragmentation of long-dimensional elements into fragments is carried out by mechanical methods, such as saws, disk cutters, turning tools, etc., or by thermal methods, such as gas, plasma, spark cutting, etc. Devices are developed, by which these methods of fragmentation are performed.

There is a method of fragmenting a two-beam fuel assembly of a nuclear reactor and a fragmentation device for its implementation according to the patent of the Russian Federation No. 2080665, IPC (International patent classification) G21C 19/00, G21F 7/00. This method includes the installation and fixation of the fuel assembly in a foldable case placed in a housing installed in a reservoir filled with water at a depth providing biological protection. This method involves fragmenting the spent assembly to ensure compact storage in the spent nuclear fuel storage.

The drawback of this method is the complexity and duration of the preparation of equipment and work.

The closest analogue of the claimed invention is the "Method of cutting lengthy elements of a nuclear reactor" invention according to the patent of Russian Federation No 2125308, IPC G21C 19/36. The method consists in fragmenting the waste long-dimensional elements of a nuclear reactor (reactor channels, control rods, thermocouples of ionization chambers, power density sensors, etc.) by transverse cutting of these elements. Long-dimensional elements are placed inside the cask, which is used as the central part of the spent reactor channel, and they are cut together.

The drawback of the closest analogue is the complexity and duration of the fragmentation of long-dimensional elements.

The problem solved by the present invention is the enhancement.

The technical result achieved by the invention, is to reduce the complexity and time of work on the fragmentation of long-dimensional elements, as well as to minimize the dose loads on the attendants.

The said technical result, regarding the method, is achieved due to the fact that in the method of fragmentation of long-dimensional elements of a nuclear reactor into fragments, including the placement of long-dimensional elements inside the cask and their subsequent cutting, it has been proposed to lower the long element into the cask to its full height, to cut the long-dimensional element on the level of the upper edge of the cask with the separation from it of a fragment equal to the height of the cask, then lower the upper part of the long-dimensional element remaining after cutting inside the cask to its full height and repeat cutting the long-dimensional element into fragments until it is fully fragmented.

It is also proposed to carry out the fragmentation of long-dimensional elements until the cask is completely filled, and then the cask, after filling it with fragments of long-dimensional elements, is moved to the storage location. In addition, it is proposed to carry out the fragmentation of long-dimensional elements with remote control in a process reservoir under water, the version of the cask must be perforated. It is proposed to remotely control the fragmentation of long-dimensional elements in the process reservoir using video surveillance and artificial lighting.

The said technical result, concerning the device, is achieved due to the fact that the device for fragmenting the long-dimensional elements of a nuclear reactor into fragments, including a lock located in the process reservoir, a cask installed therein and equipment for moving and cutting long-dimensional elements of a nuclear reactor, is proposed to be additionally equipped with video surveillance devices located in the process reservoir, to execute the cask lock in the form of the fixed boom with cask holder, installed on the bottom of the process reservoir, to execute equipment for cutting a long-dimensional element as a remotely controlled hydraulic cutter mounted with the possibility of movement on a fixed boom above the cask holder, and execute equipment to move a long-dimensional element in the form of a remotely controlled gripping device with clamping jaws, mounted on a movable boom.

It is also proposed to make the cask holder in the form of a ring, to provide a gripping device with an actuator ensuring the rotation of the clamping jaws. In addition, it has been proposed to provide a video surveillance system with a general vision camera and a video camera mounted on the gripping device, and a video camera or a rigid lensed radiation-resistant endoscope mounted on a fixed boom. It is proposed to place the floodlight lamp, and execute the cask with perforated bottom and/or walls, in the process reservoir.

Changing the method of fragmentation of long-dimensional elements, in which the fragmenting is carried out in the same cask before it is filled, and all operations are carried out under water, leads to the achievement of the specified technical result.

The claimed group of inventions is illustrated with graphic material, where in FIG. 1 a device for fragmentation of long-dimensional elements of a nuclear reactor into fragments is shown.

A device for fragmentation of long-dimensional elements of a nuclear reactor into fragments includes a cask 1 holder executed in the form of a fixed boom 3 mounted on the bottom of the process reservoir 2 filled with water, with a holder 4 of cask 1, installed in the holder 4 of a cask 1, and equipment for moving and cutting long-dimensional elements 5. The equipment for moving long-dimensional elements 5 consists of a remotely controlled gripping device 7 with clamping jaws 8 mounted on a movable boom 6, and the equipment for cutting long-dimensional elements 5 consists of a remotely controlled hydraulic cutter 9 mounted for movement on a fixed boom 3 above the cask 1 holder 4. The holder 4 of the cask 1 in FIG. 1 is executed as a ring. The gripping device 7 is equipped with an actuator 10, providing rotation of the clamping jaws 8. Also, the device for fragmentation of long-dimensional elements 5 into fragments includes a floodlight lamp 11, a general vision video camera 12 and a video camera 13 mounted on the gripping device 7. On FIG. 1 a embodiment with a rigid lensed radiation-resistant endoscope 14 mounted on a fixed boom 3 is presented.

Thus, the operation of the device and the method of fragmenting long-dimensional elements of a nuclear reactor into fragments is carried out as follows.

The cask 1 for placing long-dimensional elements 5 is installed in the holder 4 on the fixed boom 3. Using the gripping device 7 with the clamping jaws 8, the long-dimensional element 5 is gripped in the process reservoir 2, performing the surveillance with the help of the video camera 13. Then, the long-dimensional element 5 is lowered into the cask 1 with the help of the gripping device 7 to the full height of the cask 1, the long-dimensional element 5 is picked up at the level of the upper edge of the cask 1, is lifted and positioned so that the hydraulic cutter 9 is directly under the clamping jaws 8 provided that the positioning is carried out using a rigid lensed radiation-resistant endoscope 14 mounted on a fixed boom 3. Then the cutting of the long-dimensional element 5 with the separation of a fragment from it is performed and the operation of installing the remaining upper part of the long-dimensional element 5 into the cask 1, picking up and cutting of the long-dimensional element 5 to the full fragmentation, are repeated again. Then using the gripping device 7 the grip of the following long-dimensional element 5 in the process reservoir 2 is performed and fragmenting until the cask 1 is filled is performed. All operations are carried out in a process reservoir 2 filled with water with video surveillance using a video camera 12 for general vision and additional lighting with the help of a floodlight lamp 11. For water drainage a perforated cask 1 is used. After filling with fragments of long-dimensional elements 5, the cask 1 is moved to the storage location.

The claimed group of inventions provides a reduction in labour intensity, work completion time and minimization of dose loads on the attendants when fragmenting long-dimensional radioactive elements of a nuclear reactor.

The invention claimed is:

1. A method of fragmentation of elements of a nuclear reactor, comprising:
   placing a plurality of elements inside a cask;
   cutting the plurality of elements inside the cask after the step of placing the plurality of elements inside the cask, wherein the cask comprises at least one perforation configured to drain water;
   wherein for each of the elements, the steps of placing and cutting the plurality of elements comprises:
      lowering the element into the cask so that a length of the element in the cask is equivalent to a full internal height of the cask, wherein the lowering occurs using a gripper having clamping jaws;
      after the lowering step, intercepting the element at an upper edge of the cask, lifting the element, and positioning the element using video surveillance and artificial lighting so that a hydraulic cutter is directly under the clamping jaws;
      cutting the element at a position corresponding to a level of the upper edge of the cask when the element has been lowered into the cask in accordance with the lowering step, thereby separating a fragment of the element and a remaining portion of the element that is an upper part of the element, the fragment having a length equal to the full internal height of the cask; and
      lowering the remaining portion of the element inside the cask so that a length of the remaining portion of the element in the cask is equivalent to the full internal height of the cask; and
      cutting the element repeatedly to provide fragments until the element is completely cut to fragments that are no longer than the full internal height of the cask, and
   wherein the cutting of each of the plurality of elements is carried out with remote control in a process vessel under water.

2. The method according to claim 1, wherein the cutting the plurality of elements is carried out until the cask is completely filled.

3. The method according to claim 1, wherein the cask is moved to a storage location after tilling the cask with fragments of the elements.

4. The method according to claim 2, wherein the cask is moved to a storage location after filling the cask with fragments of the elements.

* * * * *